March 27, 1973 R. E. HENNEN 3,723,188
FILLING AND VENTING DEVICE FOR A STORAGE BATTERY
Original Filed Dec. 19, 1969 3 Sheets-Sheet 2
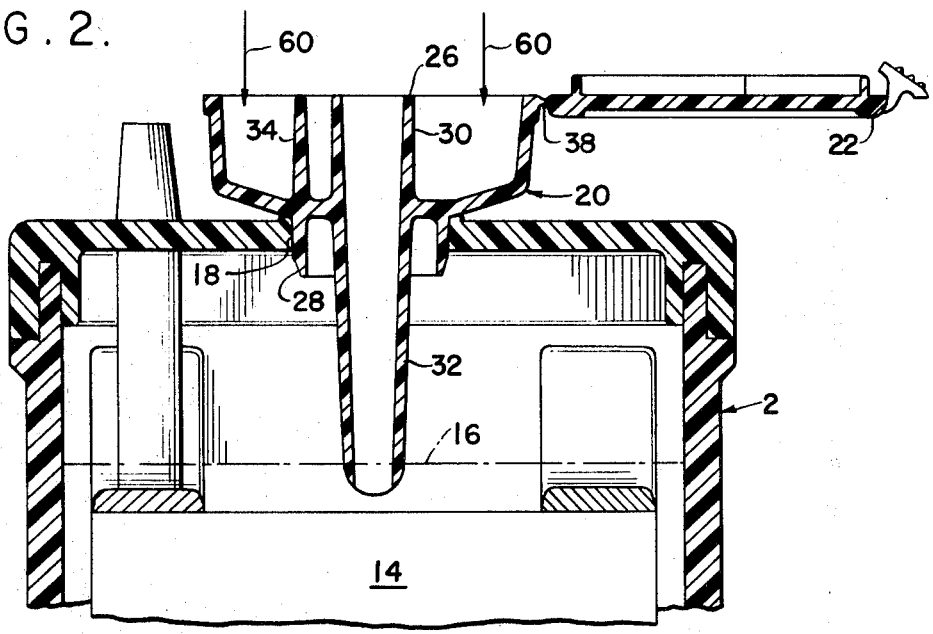
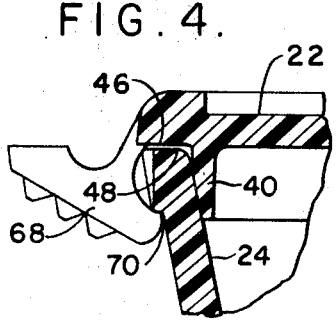
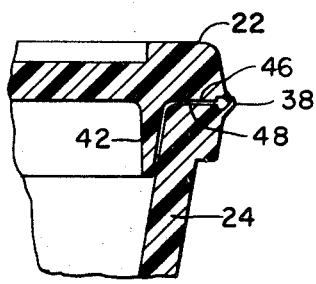
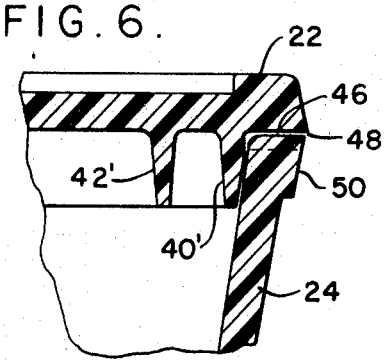
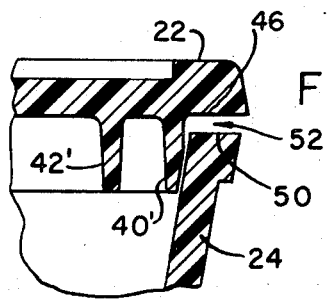
INVENTOR
ROY E. HENNEN
BY *Denton & Terry*
ATTORNEYS March 27, 1973   R. E. HENNEN   3,723,188
FILLING AND VENTING DEVICE FOR A STORAGE BATTERY
Original Filed Dec. 19, 1969   3 Sheets-Sheet 3

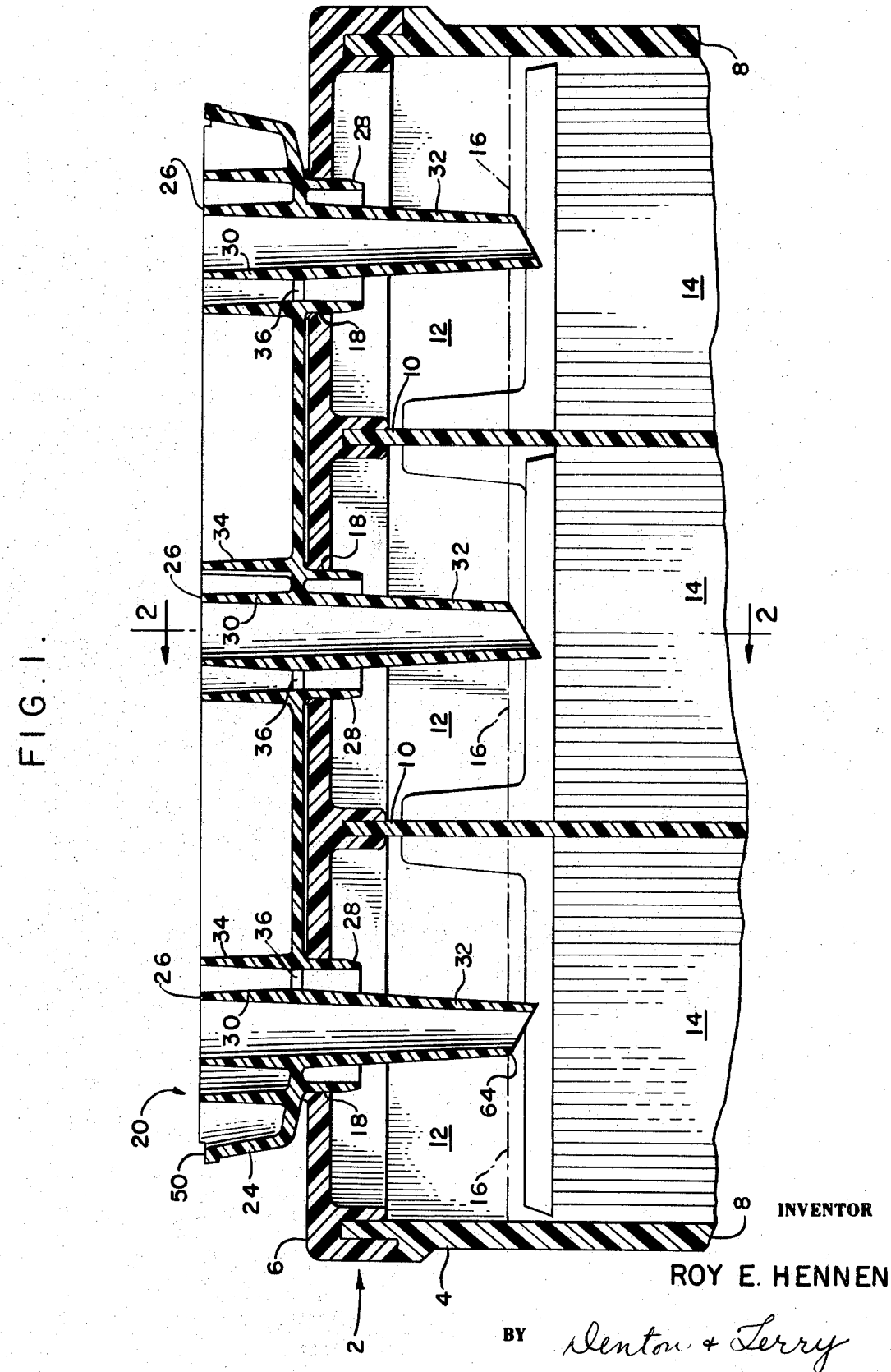

INVENTOR
ROY E. HENNEN
BY Denton & Terry
ATTORNEYS

FILLING AND VENTING DEVICE FOR A STORAGE BATTERY

Roy Erving Hennen, Mequon, Wis., assignor to Globe-Union Inc., Milwaukee, Wis.
Continuation of abandoned application Ser. No. 886,460, Dec. 19, 1969. This application Nov. 8, 1971, Ser. No. 196,835
Int. Cl. H01m 7/00
U.S. Cl. 136—162  5 Claims

ABSTRACT OF THE DISCLOSURE

A device for filling and venting each cell of a storage battery comprising a reservoir base forming a reservoir for water on the battery, a standpipe for each cell of the battery, an opening in the bottom of the base operatively associated with each standpipe for introducing the water into the cell, and closure means for sealing the top of the cell to the bottom of the base and for directing water from the opening into the cell. Each standpipe extends vertically through the reservoir into a cell to a level substantially equal to the desired operating level of liquid electrolyte in the battery, whereby water introduced into the reservoir will fill each cell of the battery until the electrolyte level reaches the bottom of the standpipe therein.

---

This is a continuation of application Ser. No. 886,460, now abandoned, filed Dec. 19, 1969.

BACKGROUND OF THE INVENTION

This invention relates to a device for filling with water and for venting a storage battery having one or more cells, and more particularly, to a device having a unitary construction that provides for filling of water and automatic levelling of electrolyte within each cell of the battery as well as for the continuous venting of gases from and the simultaneous metering of water into each cell during operation of the battery.

With the development of more powerful, longer life batteries, there has been a rapid increase in the number of applications for such batteries. One such application is in small, battery-powered, golf carts, lift trucks and the like vehicles. In these vehicles, particularly in golf carts, the battery is often located such that visual access to the filling ports of each of the cells during routine servicing is difficult to obtain, thereby necessitating the use of external metering devices or other special equipment to reach each cell and to avoid overfilling with water. Consequently, there is a specific need for a device that will bring the cell electrolyte of each of the cells of a golf cart battery or like battery to a predetermined level in the course of routine servicing over prolonged periods without the use of special equipment.

Heretofore, various devices for filling and venting the cells of a storage battery have been proposed, especially for multi-cell batteries. Some of these devices have means for introducing into the cells of the battery and for simultaneously preventing escape of gases from the cells via passages, openings or other similar venting means. In this manner, an air lock is formed in each cell and overfilling of the cells is avoided. Some of these devices may advantageously be used to simultaneously fill all the cells of a battery. Others are restricted to one cell. In general, the known filling and venting devices have adjustable venting means which are closed during filling and then subsequently opened so that the gaseous products formed during operation of the battery may escape to the atmosphere.

One such device is disclosed by U.S. Pat. 3,218,198 wherein a filling and venting construction in the form of a battery cover is provided on top of a multi-cell battery. The cover has a recessed filling trough, a filling well for each cell located in the bottom of the trough, a separate channel positioned adjacent to the filling trough having vent openings for each of the cells, and a sliding cover positioned over the battery cover and connected to the venting means positioned in the channel. When the sliding cover is positioned in an open position to allow filling of the cells via the filling wells, the venting means are closed off, thus forming air locks in each cell to avoid overfilling of the cells. When the sliding cover is closed, the venting means allow gases within the cells to escape to the atmosphere. This type of venting device has the disadvantage that the sliding cover must be accurately positioned to insure that an air lock is formed in each cell during filling and to insure that venting of the gases can take place when the cover is closed. Also with this device, it is necessary to check and replace parts which may become worn and thus fail to function properly.

SUMMARY OF THE INVENTION

The filling and venting device of this invention advantageously provides a unitary construction which overcomes the disadvantages and problems found in the prior art devices in that it provides filling means, automatic electrolyte levelling means, a reservoir for additional water above the battery, and venting means for discharging gases generated in the cells during operation of the battery and for allowing water to enter the cells until the reservoir is empty.

Thus this invention contemplates a device for filling and venting each cell of a storage battery which comprises a reservoir base forming a reservoir for water on the battery, a standpipe for each cell of the battery, an opening in the bottom of the base operatively associated with each standpipe for introducing the water into each cell, and closure means for sealing the top of each cell to the bottom of the base and for directing water from an opening into said cell; each standpipe extending vertically through the reservoir into a cell to a level substantially equal to the desired operating level of electrolyte in the battery, whereby water introducted into said reservoir will fill each cell of the battery until the electrolyte level reaches the bottom of the standpipe therein.

It will be understood that as water is added to the reservoir, this construction provides for filling and automatic levelling of electrolyte in each cell of the battery in that the gas in each cell vents through the standpipe until the cell electrolyte reaches and closes off the bottom of the standpipe and in that the gas pressure in the cell then forms an "air lock" which discourages further entry of water through the opening. Advantageously, when the reservoir is filled with water this construction further provides for venting the gases generated in each cell through the same openings that the water initially entered the cell and for metering or introducing small amounts of water from the reservoir through each of the openings into the cells until the reservoir is empty.

It has been found with the device of this invention that during operation of the battery, sufficient pressure will build up in each cell so that the gases formed will exit in the form of bubbles through the openings in the bottom of the reservoir base and water will simultaneously percolate through the openings and drain via the closure means into the subjacent cells. This percolating action continues until all the water in the reservoir has emptied into the battery. At this time gases generated in the cells will vent through the openings in an uninterrupted manner.

It will be understood that the opening in the bottom of the reservoir base operatively associated with each standpipe, must be relatively small in order to insure that the pressure built up within the battery cell when the level of electrolyte reaches the bottom of the standpipe will be sufficient to discourage the water from continuing to drain from the reservoir. In this manner an excess of water is not added to the cells. The dimensions selected for the openings are primarily dependent on the head of water within the reservoir. In one particularly effective embodiment of this invention, the reservoir has a head of about one-half inch of water and each of the openings have a width of one-sixteenth of an inch and a length of one-eighth of an inch.

In accordance with this invention, the reservoir base is provided with peripheral walls which form the reservoir for the water. Each standpipe is positioned inside the reservoir and is formed by a tubular member extending from the top level of the reservoir through the base to a distance equal to the predetermined electrolyte level in the cell of the battery on which the device is to be used. The number and spacing of the standpipes is determined by the type of storage battery to be serviced by the device. Preferably the device is constructed for use with multi-cell batteries.

The closure means of the device preferably are provided on the bottom of the reservoir base by members in the form of depending flanges, one for each of the cells of the battery on which the device is to be used. Each flange forms a liquid or water-directing channel that extends downwardly from the bottom of the reservoir base and that surrounds one of the standpipes and the opening for draining water from the base. The peripheral configuration of the flange is such that the flange will fit tightly within the filling port provided at the top of each cell of the battery, thereby sealing the port to the bottom of the reservoir base. Since most filling ports are circular openings, the flanges have a circular configuration and provide annular channels or passages around each standpipe which direct water from each of the openings in the base into the battery cells.

The device of this invention is also provided with a cover hingedly mounted on the reservoir base and with means for sealing the cover to the periphery of the reservoir base to prevent splashing of water from the reservoir. Also additional venting means are provided so that gases generated within the battery which escape through the openings adjacent to each standpipe can vent to the atmosphere when the cover is closed. In one embodiment of this invention, the additional vent means comprise a notch or groove in each end of the peripheral walls of the reservoir base which form spaces between the cover and the walls, and vent passages formed between a pair of flanges depending from the periphery of the cover at each end of the device so that gases formed in the battery can escape through the vent passages and the spaces at each end of the device.

Preferably the device of this invention is made as a unitary construction consisting of a single molded plastic part incorporating the reservoir base, the standpipes, the closure means, the cover hingedly secured to the base, and other structural elements hereinafter described in greater detail.

BRIEF DESCRIPTION OF THE DRAWINGS

Additional advantages of the device of this invention will become apparent upon reference to the following detailed description of a preferred embodiment and to the accompanying drawings, in which:

FIG. 1 is a front elevational view of a portion of a three-cell storage battery with a portion of the casing broken away to show the venting and filling device of the invention in section positioned on the battery with the cover of the device in an open position;

FIG. 2 is a side elevational view, taken along line 2—2 on FIG. 1, showing the device of the invention on the battery in section on a reduced scale;

FIG. 4 is a fragmentary enlarged view, taken along line 4—4 on FIG. 3, showing the latching mechanism of the cover partially in section when the cover is in its closed position on top of the reservoir base of the device;

FIG. 5 is a fragmentary enlarged sectional view, taken along line 5—5 of FIG. 3, showing the seal provided by one of the sealing flanges along the rear of the device when the cover is in its closed position on the reservoir base;

FIG. 6 is a fragmentary enlarged sectional view, taken along line 6—6 of FIG. 3, showing the seal provided by a sealing flange along a front portion of one end of the device when the cover is closed on the reservoir base; and FIG. 7 is a fragmentary enlarged sectional view, taken along line 7—7 of FIG. 3, showing one of the venting spaces provided between the cover and the reservoir base when the cover is closed.

DESCRIPTION OF THE PREFERRED EMBODIMENT

Figure 3:
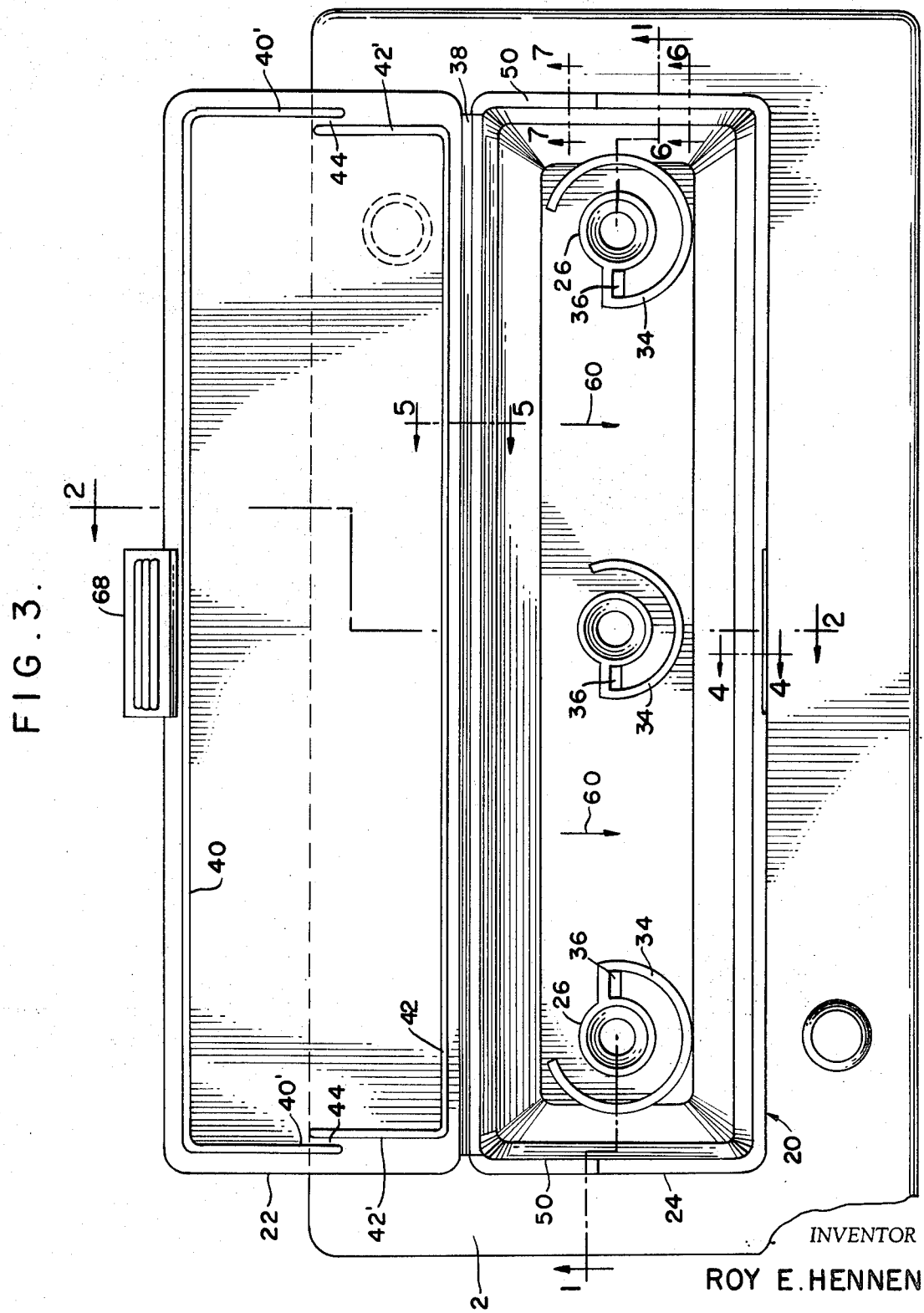
FIG. 3 is a plan view of the device of the invention on the battery with the cover open, showing the relative positioning of a pair of sealing flanges on the cover.

In FIG. 1, reference numeral 2 designates a three-cell storage battery positioned in a relatively inaccessible location, e.g., positioned in a golf cart so that filling of all of the filling ports is difficult. The battery has a casing body 4 and casing cover 6 integrally bonded to the sidewalls of the casing body. Two vertical interior walls 10 are also bonded integrally with the casing cover and the casing body to form three cell chambers 12. In each of the cell chambers an electrode assembly is schematically shown and is designated by reference numeral 14. The electrode assembly is of a known conventional design used in acid-lead storage batteries and comprises positive and negative plates alternately arranged with suitable separators and with electrode connectors of opposite polarity coupled to the respective positive and negative plates of the assembly. Connection means in the form of terminal posts are connected with the electrode assemblies for providing external and/or internal electrical connections in the circuit in which the storage battery is to be utilized. The proper level for the acid electrolyte, e.g. sulfuric acid, within each cell chamber is indicated by the dashed line designated by reference numeral 16.

Three filling ports or openings 18 are provided in the casing cover for allowing introduction of water into each cell chamber and for venting the gases generated within the battery during its operation. Each of the filling ports has a smooth-walled raised annular lip adapted to engage a vent plug conventionally used for closing of the ports. The filling and venting device of this invention, designated by reference numeral 20, is placed on top of the battery cover.

As shown in FIGS. 1 and 2, the device of this invention has a unitary construction and consists of a single molded plastic unit incorporating an integrally molded cover 22 on a reservoir base 24 having peripheral outer walls that form a reservoir for water to be added to the battery. The reservoir base is provided with three standpipes 26, one for each of the cells of the storage battery. A closure member or means 28 surrounds the lower portion of each standpipe.

Each of the closure members is dimensioned to fit tightly within a filling port so that the port is sealed by contact with the outer periphery of the closure member. In the embodiment shown, the closure members are provided by circular flanges or skirts which extend downwardly from the bottom surface of the reservoir base and which surround one of the standpipes to provide an annular channel around the standpipe.

Each standpipe 26 has an upper tubular portion 30 which extends from the bottom of the reservoir base to a level equal to the height of the peripheral walls of the base (see FIGS. 1 and 2). The lower tubular portion 32 of each of the standpipes extends downwardly from the bottom of the base to a level substantially equal to the desired electrolyte level 16 within each of the battery cells. The bottom edge of each standpipe is angled with respect to the longitudinal axis of the pipe to facilitate draining back of liquid from the standpipe during operation of the battery.

Liquid distributing means in the form of semi-circular baffles 34 are provided adjacent to the upper portions of each of the standpipes. As shown in FIG. 3, each baffle 34 extends from the bottom of the reservoir upwardly to form a curved annular-type passage that partially surrounds the upper portions of each standpipe. Within each curved passage, adjacent to the standpipes, is a rectangular hole or vent opening 36 which extends through the bottom of the reservoir base to permit water in the reservoir to pass through the passage and to drain into the subjacent cell. Each hole is positioned in the bottom of the base to discharge into the annular space formed by the standpipe and the closure member.

As shown in FIGS. 1 and 3, the bottom of the reservoir base slopes downwardly towards the center portion and the openings 36 are spaced along the center portion of the base at the lowest portion of the reservoir to promote uniform draining of water into each of the cells of the battery.

The cover of the reservoir is integrally secured to the base along the upper edge of the rear longitudinal peripheral outer wall by a narrow neck-like joining flange 38. This flange is flexible and will bend so that the cover can be moved from an open position (shown in FIGS. 2 and 3) to a closed position on top of the reservoir base.

The cover 22 has two depending skirt-like sealing flanges 40 and 42 which are spaced inwardly from its outer periphery. As shown in FIG. 3, flange 40 extends along the front and partially around the ends of the cover; whereas flange 42 extends along the rear and also partially around the ends. At the ends or sides of the cover, flanges 40 and 42 overlap each other with the end portions of flange 42 extending within the end portions of flange 40 to provide narrow spaces 44 therebetween.

As shown by the fragmentary enlarged views in FIGS. 4 and 5, when the cover is in its closed position on top of the reservoir base, flanges 40 and 42, respectively, fit snugly in contact with the inner surfaces of the front and rear longitudinal peripheral outer walls of the reservoir base. The end portion 40' of flange 40, as shown in FIG. 6, also contact the inner surfaces of the peripheral outer walls at the ends of the reservoir base.

When the cover is closed, the peripheral surface 46 which extends around the flanges 40 ond 42 on cover 22, contacts the upper surface 48 on the outer walls of the reservoir base (see FIGS. 4, 5 and 6). With this arrangement the outer surfaces of the longitudinal portions of the depending flanges 40 and 42 and the end portions of flange 40 engage the inner surfaces of the peripheral walls of the base and cooperate with surfaces 46 and 48 to provide a peripheral seal between the cover and the base.

On the rear portion of each of the end walls of the reservoir base a notch or groove 50 is provided. The groove forms a venting space or passageway 52 for the escape of gases on each end of the device when the cover is in its closed position on top of the base. Each notch, as shown in FIG. 3, extends from a point less than about half way along the end wall of the base to the point where the flexible neck-like joining flange 38 connects the base to the cover. It will be understood that these passageways communicate with spaces 44 formed by the end portions of flanges 40 and 42.

A latch mechanism is provided on the front edges of the device of this invention for securing the cover 22 in its closed position. The latch mechanism includes a flexible catch 68 on the cover which swings around the upper edge of the front peripheral wall of the base to engage a ledge 70 on the front wall of the base.

In using the device of this invention, the standpipes and associated closure members 28 are inserted into the filling ports 18 of the battery as shown in FIGS. 1, 2 and 3. The cover is placed in the open position shown in FIG. 2 and the user of the battery pours water into the reservoir by a garden hose or other appropriate means, for example, in the areas indicated by arrows 60 in FIGS. 1, 2 and 3. Water entering the reservoir at these locations begins to fill the reservoir to the level equal to the height of the groove 50 in the end walls of the base. At the same time water will pass into the annular-like distributing passages surrounding each of the standpipes, flow downwardly through the openings 36 and be directed by closure members 28 into the associated battery cells 12; air in the cells being displaced through the standpipes.

The air in the cell will continue to escape up the standpipe to atmosphere until the liquid level of electrolyte in the cell rises to close off the bottom of the standpipe. Once the electrolyte level in the cell has reached the upper edge 64 of the discharge opening of the standpipe, the gas entrapped in the cell will exert sufficient pressure to discourage further entry of water into the cell through the opening 36. At this point of temporary equilibrium, the reservoir will remain full or overflow if water continues to be added past the upper edge of the peripheral walls. The cover 22 is then closed.

During subsequent operation of the battery, gases generated within a cell will emerge at the vent opening as a bubble or bubbles, rise to the surface of the water within the reservoir and then dissipate or vent to the atmosphere through the spaces 44 and 52 provided at each of the ends. Water is prevented from splashing from the reservoir by the arrangement of sealing flanges 40 and 42.

It will be understood that the water in the reservoir will very slowly percolate through the vent openings into each cell as the gas bubbles emerge from the cells. This allows the reservoir to empty and permits the venting means of the device to function in an ordinary manner, i.e. the gases generated within the cell will pass upwardly through the vent openings and then out through spaces 44 and 52 provided at each of the ends of the device.

Any liquid backed up in the standpipe, i.e. either electrolyte pulled up by capillary action or water introduced during filling of the cell, will also drain into the cell. Thus, it will be appreciated that water introduced into the upper portion of the standpipe after the reservoir is initially filled with water and the desired level of electrolyte has been reached in the cell, will back up and overflow over the top edge of the standpipe and subsequently fall in the reservoir. When the cover is closed the top of each standpipe is also substantially closed off, thereby preventing gas in the cells from venting through the standpipe if the electrolyte level should fall below the standpipe. However, with the standpipe closed by the cover, gas would vent out through opening 36.

It will also be appreciated that the liquid distributing passages formed by baffles 34 tend to equalize filling of the cells by preventing the water introduced into the reservoir to pass immediately into the nearest vent opening 36.

Furthermore, it will be recognized that additional venting means other than those shown may be provided in the cover to allow escape of gases generated in the cells.

What is claimed is:

1. A device for filling and venting a storage battery comprising a reservoir base forming a reservoir for water on the battery, said battery having cells therein, a standpipe for each cell of the battery, an opening in the bottom of the base adjacent to each standpipe for introducing the water into each cell, closure means for sealing the top of each cell to the bottom of the base and for directing water from said opening into said cell; each standpipe presenting a substantially straight walled surface contiguous to said opening, said standpipe extending substantially vertically through the reservoir into a cell to a level substantially equal to the desired operating level of electrolyte therein, baffle means in said reservoir operatively associated with each said opening for directing water from a horizontal plane to a vertical one and into said opening, a cover secured to said reservoir base and venting means between said cover and said base, whereby water introduced into said reservoir will fill each cell of the battery until the electrolyte level reaches the bottom of said standpipe and said venting means and said opening in the bottom of said base will permit the water in the reservoir to subsequently percolate through said opening as gas bubbles emerge from said cells.

2. The device of claim 1 in which said closure means comprises a circular flange for each of the cells, said flange extends downwardly from the bottom of the reservoir base into the filling port provided at the top of the cell, and said baffle means partially surrounding the standpipe and the opening adjacent said standpipe, said baffle means and said standpipe providing an annular-like channel for directing water into said cell.

3. The device of claim 1 further comprising said cover hingedly secured to the reservoir base for closing off the top of the reservoir and said venting means between the cover and the base for allowing gases generated in the cells of the battery to escape to the atmosphere via said openings when the cover is closed.

4. The device of claim 3 in which said reservoir base has peripheral walls which form said reservoir, said cover has a pair of sealing flanges arranged along its periphery to provide a peripheral seal between the cover and the peripheral walls when the cover is in its closed position, and said venting means comprise vent passages formed between the end portions of said sealing flanges and a groove in each of the ends of the peripheral walls.

5. The device of claim 3 in which the reservoir base, each standpipe, the closure means and the cover are integrally molded together from a plastic acid-resistant material to form a unitary construction.

References Cited

UNITED STATES PATENTS

| | | | |
|---|---|---|---|
| 3,485,678 | 12/1969 | Blaich et al. | 136—162 |
| 2,930,831 | 3/1960 | Hemig | 136—177 |
| 3,369,940 | 2/1968 | Slautterback | 136—177 |

FOREIGN PATENTS

| | | | |
|---|---|---|---|
| 663,794 | 12/1951 | Great Britain | 136—177 |

DONALD L. WALTON, Primary Examiner

U.S. Cl. X.R.

136—177, 178